(12) United States Patent
Berard et al.

(10) Patent No.: US 9,987,745 B1
(45) Date of Patent: Jun. 5, 2018

(54) EXECUTION OF ROBOTIC TASKS

(71) Applicant: Google Inc., Mountain View, CA (US)

(72) Inventors: Stephen Berard, Waltham, MA (US);
Benjamin Swilling, Waltham, MA (US); Matthew Malchano, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 124 days.

(21) Appl. No.: 15/089,355

(22) Filed: Apr. 1, 2016

(51) Int. Cl.
  *G06F 19/00* (2018.01)
  *G05B 19/18* (2006.01)
  *B25J 9/16* (2006.01)

(52) U.S. Cl.
  CPC .............. *B25J 9/163* (2013.01); *Y10S 901/09* (2013.01)

(58) Field of Classification Search
  None
  See application file for complete search history.

(56) References Cited

U.S. PATENT DOCUMENTS

| | | |
|---|---|---|
| 5,121,805 A | 6/1992 | Collie |
| 5,550,953 A | 8/1996 | Seraji |
| 5,825,981 A * | 10/1998 | Matsuda .......... G05B 19/41815 318/568.16 |
| 6,584,377 B2 | 6/2003 | Saijo et al. |
| 6,594,552 B1 | 7/2003 | Nowlin et al. |
| 6,643,563 B2 | 11/2003 | Hosek et al. |
| 8,242,730 B2 | 8/2012 | Nichols et al. |
| 8,271,138 B2 | 9/2012 | Eliuk et al. |
| 8,428,781 B2 | 4/2013 | Chang et al. |

(Continued)

FOREIGN PATENT DOCUMENTS

| | | |
|---|---|---|
| EP | 0965416 | 12/1999 |
| EP | 1642687 | 4/2006 |

(Continued)

OTHER PUBLICATIONS

Geijtenbeek et al., "Flexible Muscle-Based Locomotion for Bipedal Creatures," ACM Transactions on Graphics, 2013, 11 pages, vol. 32, No. 6.

(Continued)

*Primary Examiner* — Bhavesh V Amin
(74) *Attorney, Agent, or Firm* — Honigman Miller Schwartz and Cohn LLP

(57) ABSTRACT

The present disclosure relates to methods and systems for robust robotic task execution. An example method includes obtaining a task-level goal for a robot associated with one or more sub-goals, where accomplishment of the one or more sub-goals accomplishes the task-level goal. Carrying out an operation in pursuance of a given sub-goal may involve controlling at least one actuator of the robot. The method also includes determining one or more parameters indicative of a state of a system that includes the robot and an environment proximate to the robot. The method further includes selecting a particular sub-goal based on at least one of the one or more parameters. Additionally, the method includes selecting at least one controller based on at least one of the one or more parameters and the selected sub-goal. Further, the method includes causing the robot to operate in accordance with the at least one selected controller.

18 Claims, 11 Drawing Sheets

(56) References Cited

U.S. PATENT DOCUMENTS

| | | |
|---|---|---|
| 8,583,285 B2 | 11/2013 | Aurnhammer et al. |
| 8,639,386 B2 | 1/2014 | Summer et al. |
| 8,644,986 B2 | 2/2014 | Tsuboi et al. |
| 9,440,353 B1 | 9/2016 | Da Silva et al. |
| 2003/0120388 A1 | 6/2003 | Kuroki et al. |
| 2005/0113973 A1 | 5/2005 | Endo et al. |
| 2005/0240307 A1 | 10/2005 | Kuroki et al. |
| 2006/0095160 A1* | 5/2006 | Orita ............... G05D 1/027 700/248 |
| 2006/0265103 A1* | 11/2006 | Orita ............... G05D 1/0251 700/245 |
| 2007/0050088 A1 | 3/2007 | Murray et al. |
| 2007/0168080 A1 | 7/2007 | Takenaka et al. |
| 2007/0168082 A1* | 7/2007 | Kim ............... B25J 9/1658 700/245 |
| 2007/0260356 A1 | 11/2007 | Kock et al. |
| 2009/0234499 A1* | 9/2009 | Nielsen ............... B25J 9/161 700/250 |
| 2010/0217438 A1* | 8/2010 | Kawaguchi ............ B25J 9/1661 700/248 |
| 2011/0066283 A1 | 3/2011 | Hammam et al. |
| 2012/0215354 A1 | 8/2012 | Krasny et al. |
| 2012/0265498 A1 | 10/2012 | Choi et al. |
| 2012/0303162 A1 | 11/2012 | Orita |
| 2013/0184870 A1 | 7/2013 | Ota et al. |
| 2013/0310979 A1 | 11/2013 | Herr et al. |
| 2014/0121832 A1 | 5/2014 | Sasai |
| 2014/0249670 A1 | 9/2014 | Yamane |
| 2014/0257558 A1 | 9/2014 | Frische et al. |
| 2015/0120047 A1* | 4/2015 | Motoyoshi ............ B25J 9/1697 700/253 |

FOREIGN PATENT DOCUMENTS

| | | |
|---|---|---|
| EP | 1721711 | 11/2006 |
| WO | 2015056178 | 4/2015 |

OTHER PUBLICATIONS

International Searching Authority, International Search Report and Written Opinion dated May 30, 2016, issued in connection with International Patent Application No. PCT/US2015/045253, filed on Aug. 14, 2015, 16 pages.

Non-Final Office Action dated Apr. 4, 2016, issued in connection with U.S. Appl. No. 14/584,558, filed Dec. 29, 2014, 14 pages.

Non-Final Office Action dated Mar. 14, 2016, issued in connection with U.S. Appl. No. 14/586,519, filed Dec. 30, 2014, 9 pages.

Notice of Allowance dated Aug. 12, 2016, issued in connection with U.S. Appl. No. 14/586,519, filed Dec. 30, 2014, 6 pages.

Notice of Allowance dated May 25, 2016, issued in connection with U.S. Appl. No. 14/584,558, filed Dec. 29, 2014, 8 pages.

Tchoń, Krzysztof, "Repeatability of inverse kinematics algorithms for mobile manipulators," IEEE Transactions on Automatic Control, Sep. 2002, 8 pages.

Da Silva et al., U.S. Appl. No. 15/230,776, filed Aug. 8, 2016, entitled "Determination of Robot Behavior," 79 pages.

\* cited by examiner

| Distance from Door | Door open? | Sub-goal |
|---|---|---|
| > 2 feet | – | Move to door |
| <= 2 feet | no | Open door |
| <= 2 feet | yes | Move through door |
| through door | – | Finish moving through door |

| Robot State | Environment State | Environment Parameters | Locomotion Controller | Manipulation Controller |
|---|---|---|---|---|
| Stable | - | - | Trot | Rest |
| Slipping | - | - | Recovery | Rest |
| Manipulator moved | - | - | Trot | Move to rest |
| - | Obstruction in front of robot | - | Stand | Rest |

| Robot State | Environment State | Environment Parameters | Locomotion Controller | Manipulation Controller |
|---|---|---|---|---|
| Stable | Door closed | - | Walk | Move toward door |
| Stable | Door closed | Low friction door | Walk | Push door |
| Stable | Door closed | High friction door | Walk, Strong Posture | Push door |
| Stable | Door open | - | Walk | Move to rest |
| Slipping | - | - | Recovery | - |

Figure 8B

EXECUTION OF ROBOTIC TASKS

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic devices operate is becoming more intelligent, efficient, and intuitive. As robotic devices become increasingly prevalent in numerous aspects of modern life, it is desirable for robotic systems to be efficient. Therefore, a demand for efficient robotic devices has helped open up a field of innovation in actuators, movement, sensing techniques, as well as component design and assembly.

SUMMARY

The present application discloses implementations that relate to robust robotic task execution. One example describes a robot. The robot includes at least one actuator, a control system, memory, and a processor. The control system is configured to control the at least one actuator. The memory is configured to contain instructions. The processor is configured to execute the instructions to perform a set of operations. The operations include obtaining a task-level goal for a robot associated with one or more sub-goals. Carrying out an operation in pursuance of a given sub-goal involves controlling at least one actuator of the robot. Accomplishment of the one or more sub-goals accomplishes the task-level goal. The operations also include determining, by the processor, one or more parameters indicative of a state of a system that includes the robot and an environment proximate to the robot. The operations further include selecting, from among the one or more sub-goals, a particular sub-goal based on at least one of the one or more parameters. Additionally, the operations include selecting, from among one or more controllers, at least one controller based on at least one of the one or more parameters and the selected sub-goal. Further, the operations include causing the control system to operate in accordance with the selected controller.

Another example describes a method. The method includes obtaining, from a computing device, a task-level goal for a robot associated with one or more sub-goals. Carrying out an operation in pursuance of a given sub-goal involves controlling at least one actuator of the robot. Accomplishment of the one or more sub-goals accomplishes the task-level goal. The method also includes determining, by a processor of the robot, one or more parameters indicative of a state of a system that includes the robot and an environment proximate to the robot. The method further includes selecting, from among the one or more sub-goals, a particular sub-goal based on at least one of the one or more parameters. Additionally, the method includes selecting, from among one or more controllers, at least one controller based on at least one of the one or more parameters and the selected sub-goal. Further, the method includes causing the robot to operate in accordance with the at least one selected controller.

In still another example, the present application describes a non-transitory computer-readable medium having instructions stored thereon that, upon execution by at least one processor, causes performance of a set of operations. The operations include obtaining, from a computing device, a task-level goal for a robot associated with one or more sub-goals. Carrying out an operation in pursuance of a given sub-goal involves controlling at least one actuator of the robot. Accomplishment of the one or more sub-goals accomplishes the task-level goal. The operations also include determining, by a processor of the robot, one or more parameters indicative of a state of a system that includes the robot and an environment proximate to the robot. The operations further include selecting, from among the one or more sub-goals, a particular sub-goal based on at least one of the one or more parameters. Additionally, the operations include selecting, from among one or more controllers, at least one controller based on at least one of the one or more parameters and the selected sub-goal. Further, the operations include causing the robot to operate in accordance with the at least one selected controller.

In yet another example, the present application describes a system. The system includes a means for obtaining, from a computing device, a task-level goal for a robot associated with one or more sub-goals. Carrying out an operation in pursuance of a given sub-goal involves controlling at least one actuator of the robot. Accomplishment of the one or more sub-goals accomplishes the task-level goal. The system also includes a means for determining, by a processor of the robot, one or more parameters indicative of a state of a system that includes the robot and an environment proximate to the robot. The system further includes a means for selecting, from among the one or more sub-goals, a particular sub-goal based on at least one of the one or more parameters. Additionally, the system includes a means for selecting, from among one or more controllers, at least one controller based on at least one of the one or more parameters and the selected sub-goal. Further, the system includes a means for causing the robot to operate in accordance with the at least one selected controller.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 7 is a table illustrating an example relationship between system state parameters and sub-goals, according to an example embodiment.

FIG. 8A is a table illustrating an example relationship between system state parameters, locomotion controllers, and manipulation controllers, according to an example embodiment.

FIG. 8B is a table illustrating an example relationship between system state parameters, locomotion controllers, and manipulation controllers, according to an example embodiment.

DETAILED DESCRIPTION

Figure 1:
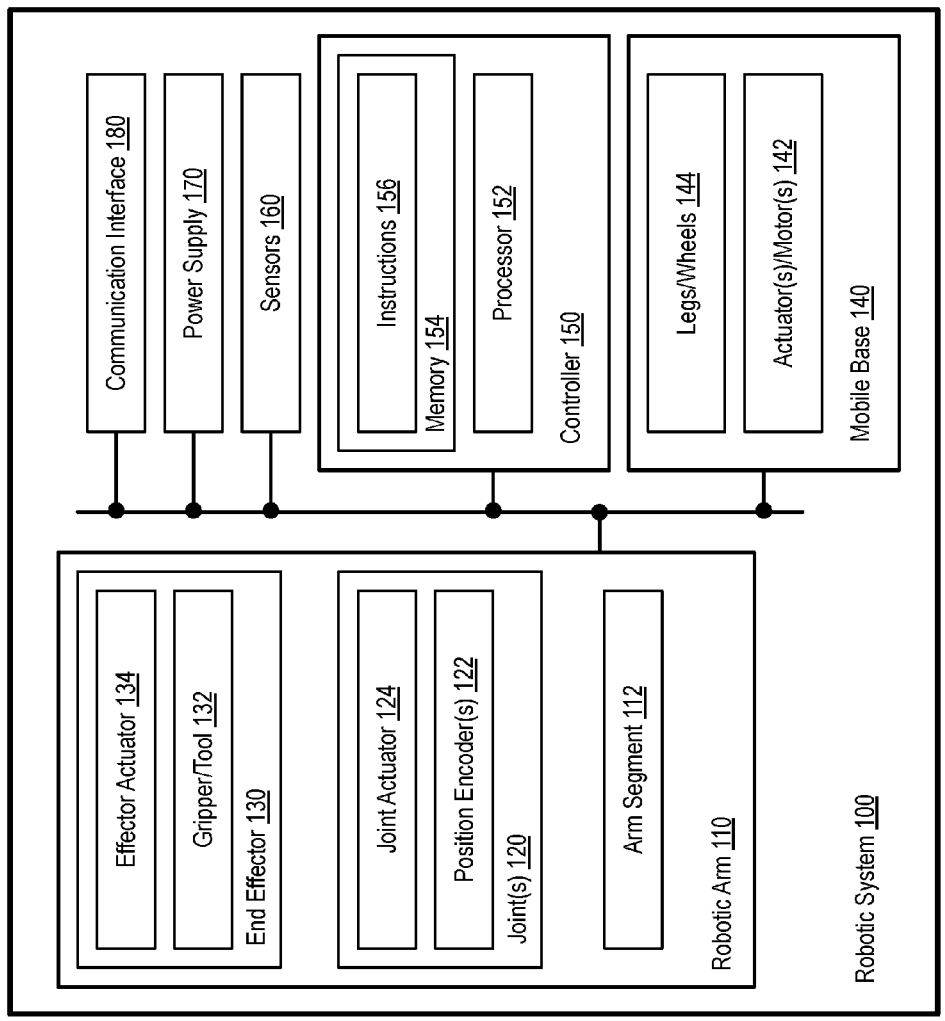
FIG. 1 is a schematic diagram of a robotic system, according to an example embodiment.

The following detailed description describes various features and operations of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. Overview

The present application discloses implementations that relate robotic task execution. Some robots may be equipped with locomotive elements—such as legs, wheels, fins, springs, or any combination thereof—which enable the robot to move about within an environment. Some robots may also be equipped with a manipulator—such as a robotic arm with an end effector—which enable the robot to interact with objects in the environment. Controlling a robot capable of both locomotion and manipulation typically involves providing separate body movement and manipulator instructions to the robot. Explicitly determining the locomotion operations and manipulation operations that together accomplish a high-level goal may be computationally difficult or involve a skilled human operator.

Consider a scenario in which a quadruped robot with a manipulator arm is instructed to pick up an object that is out of reach of the manipulator arm. A typical control scheme may provide independent control for the quadruped robot's legs and the manipulator arm. Because the object is beyond the range of motion of the manipulator arm, the robot might first walk towards the object until the object is close enough to be picked up by the manipulator arm. However, since the robot's body position directly affects the position of the manipulator arm, knowledge of the robot's final body position may be required in order to accurately move the manipulator arm to pick up the object. This process may involve causing the robot to walk forward, stop once the object is within range of the manipulator arm, then moving the robot's arm to pick up the object.

As illustrated in the scenario above, accomplishing task-level goals—even simple ones—may involve performance of a series of operations or sub-goals. For complex robot control involving multiple task-level goals, this type of explicitly choreographed robotic operation may be difficult. Additionally, aspects of the environment or the robot's state may be dynamic and change while the robot attempts to perform the task-level goal, causing the originally-planned control operations to be insufficient for accomplishing the task-level goal.

The action, operation, or behavior of a robot that achieves the task-level goal may depend upon the state of the robot, performance capabilities and constraints of the robot, the state of the environment, and/or other aspects of the environment. Referring back to the above scenario, the robot may only need to walk toward the object if that object is out of reach of the manipulator. Thus, the "walk toward object" action might only be performed when the robot's position is beyond a threshold distance from the object. Once the robot within that threshold distance, the manipulator arm may be capable of picking up the object. Thus, the "reach and pick up object" action might only be performed when the robot's position is within the threshold distance from the object. In this example, the particular operation for the robot to perform in order to accomplish (or working toward accomplishing) the task-level goal depends upon a condition—whether or not the robot is within a threshold distance of the object.

In the above-described example, the "walk toward object" and "reach and pick up object" may be referred to herein as "sub-goals." A sub-goal may be an action, operation, or behavior of the robot whose achievement accomplishes (or works towards accomplishing) the task-level goal for a particular state of the overall system (e.g., the robot and the environment).

An example implementation involves assessing the state of the robot and environment in order to determine a sub-goal to carry out for accomplishing a task-level goal. In some instances, selecting a sub-goal may involve comparing a particular metric (e.g., the distance between the robot and an object) to a threshold (e.g., within the manipulator arm's range of motion) in order to determine which sub-goal to select (e.g., "walk toward object" or "reach and pick up object"). In other instances, multiple metrics may be compared to respective thresholds in order to select one sub-goal from a set of sub-goals, where each sub-goal is mapped to a particular set of conditions such that a range of possible states of the robot and environment are accounted for. Regardless of the particular selection technique, a sub-goal may be selected from two or more sub-goals that each accomplish (or work towards accomplishing) a task-level goal, where each sub-goal is mapped to one or more conditions.

Once a sub-goal is selected, a locomotion "controller" and a manipulation "controller" associated with that sub-goal may be selected from multiple locomotion controllers and manipulation controllers based at least on the state of the robot. As referred to herein, a "controller" may refer to a control configuration and parameters that, when applied to a control system that controls the robot's actuators, causes the robot to perform a particular action, carry out an operation, or act in accordance with a particular behavior. A controller may define both the robot's action—such as standing, trotting, or recovering—and the characteristics of those actions—such as the robot's speed, rate of recovery, distance to travel, etc.

Each sub-goal may have a set of controllers that each accomplish the sub-goal, depending on the state of the robot. For example, a sub-goal to walk toward an object may be associated with a walking controller, a standing controller, and a recovery controller. For the sub-goal of "walk toward object," the sub-goal may be accomplished with the walking controller for most states of the robot. However, once the robot reaches its destination, the sub-goal may be accomplished by standing (e.g., employing the standing controller). If the robot slips while walking toward the object, the sub-goal may be accomplished by first recovering from the slip (e.g., employing the recovery controller), then resuming walking toward the object (e.g., switching back to the walking controller). Because accomplishing the selected sub-goal also accomplishes the task-level goal, the selected controller effectively accomplishes the task-level goal given the state of the robot and the environment.

Thus, the locomotion and manipulation controller selectors may improve the robustness of the robot's ability to accomplish a sub-goal. Unexpected changes to the state of the robot or environment—which might otherwise impede the completion of a sub-goal—may be properly handled by selecting an appropriate controller. Furthermore, decomposing a task-level goal into sub-goals and mapping each of those sub-goals to a set of conditions may improve the robustness of the robot's ability to complete a task-level goal. Once the sub-goals and controllers have been mapped to state parameter values or ranges, carrying out a complex task-level goal may involve a simple instruction to begin execution of that task-level goal.

In some implementations, the controllers within the sub-goal may be arranged hierarchically, such that some controllers have a higher priority than others. The controller selection technique may involve evaluating the viability of each controller from the highest priority controller to the lowest priority controller. If the highest priority controller can be carried out, then that controller is selected; if it cannot be carried out, the next highest priority controller may be evaluated.

II. Example Robotic Systems

FIG. 1 is a schematic diagram of a robotic system 100, according to an example embodiment. The robotic system 100 may include at least one robotic arm 110, a mobile base 140, a controller 150, sensors 160, a power supply 170, and a communication interface 180.

In an example embodiment, the robotic arm 110 may include a plurality of arm segments 112. In such a scenario, the arm segments 112 may be coupled via one or more joints 120. The one or more joints 120 may include at least one joint actuator 124 and at least one position encoder 122. In some embodiments, the robotic arm 110 may include an end effector 130. As such, the end effector 130 may be arranged with a gripper/tool 132. The gripper/tool 132 may be operated by adjusting at least one effector actuator 134.

In some embodiments, the mobile base 140 may include legs/wheels 144 and at least one corresponding actuator/motor 142. In such a scenario, the mobile base 140 may be operable to move the robotic system 100 via one or more wheels and/or one or more legs. Other types of mobile bases are contemplated, including those associated with flying, floating, hovering, or rail-based robotic systems.

Controller 150 includes one or more processors 152 and a memory 154. In an example embodiment, the one or more processors 152 may include one or more general purpose processors (e.g., microprocessors) and/or one or more special purpose processors—e.g., digital signal processors (DSPs), graphics processing units (GPUs), floating point units (FPUs), network processors, or application-specific integrated circuits (ASICs). Additionally or alternatively, the controller 150 may include at least one programmable in-circuit serial programming (ICSP) microcontroller.

The memory 154 may include volatile and/or non-volatile storage components, such as optical, magnetic, organic, or other memory or disc storage, which may be integrated in whole or in part with the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

While FIG. 1 illustrates the controller 150 as being schematically apart from various other elements of the robotic system 100, the controller 150 may be physically located at, or incorporated into, one or more elements of robotic system 100. For example, the controller 150 may be incorporated into the robotic arm 110. Alternatively, the controller 150 may be incorporated into the mobile base 140. Yet further, the controller 150 may be distributed among at least two elements of the robotic system 100. In another embodiment, the controller 150 may include a distributed computing network and/or a cloud computing network.

The controller 150 may be communicatively coupled to various other elements of robotic system 100 via a communication interface 180. Additionally or alternatively, the communication interface 180 may be operable to establish a wireless communication link with another robotic system, a remote computer, or a remote network.

The communication interface 180 may include one or more wireless interfaces and/or one or more wired interfaces, which allow the controller 150 to communicate with the other elements of robotic system 100 or other systems via one or more networks. In an example embodiment, wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Wired interfaces may include an Ethernet interface, a Universal Serial Bus (USB) interface, or similar interface to communicate via a wire, a twisted pair of wires, a coaxial cable, an optical link, a fiber-optic link, or other type of physical connection. The communication interface 180 may additionally or alternatively include one or more routers, switches, and/or other devices or networks.

The sensors 160 may include one or more of: a position encoder, a pressure sensor, LIDAR, RADAR, an ultrasonic rangefinder, a microphone, a camera, an inertial navigation system (INS), a global positioning system (GPS), or another type of sensor. The sensors 160 may provide information indicative of a position of the robotic system 100. Additionally or alternatively, the sensors 160 may provide information indicative of other aspects of an environment proximate to the robotic system 100. For example, the sensors 160 may provide information about obstacles (e.g., walls, stairs, closed doors, etc.), objects (e.g., chair, end table, rug, etc.), or living beings (e.g., human, dog, cat, hamster, etc.) around the robotic system 100. The sensors 160 may also be configured to provide information indicative of an operating constraint, such as a speed limit, noise limit, boundary, or another type of constraint with respect to robotic operations.

Additionally or alternatively, the sensors 160 may provide information about a pose or position of one or more elements of the robotic system 100. For example, a plurality of position encoders associated with the robotic arm 110 may provide information about a current position of the end effector 130 of the robotic arm 110. Additionally or alternatively, a pressure sensor associated with a gripper/tool 132 may provide information about a grip pressure of an object being held by the end effector 130. In some embodiments, the sensors 160 may provide information about a center of gravity of the robotic system 100 and/or information about the balance of the robotic system 100.

In an example embodiment, the power supply 170 may include a battery configured to provide electrical power. For example, the battery may include one or more lithium ion batteries. Additionally or alternatively, the power supply 170 may include a hydrocarbon fuel (e.g., gasoline) and at least one internal combustion engine. Yet further, the power supply 170 may include photocells (e.g., solar panels). Other types of power supplies are contemplated within the scope of the present disclosure.

The memory 154 may be configured to store computer-readable program instructions 156. Furthermore, the one or more processors 152 may be configured to execute the instructions 156 so as to carry out various operations described herein.

In an example embodiment, the processor 152 may be operable to receive information from the sensors 160. The received information may be indicative of one or more aspects of an environment proximate to the robotic system 100. Based on the received information, the processor 152 may determine an external environment state. The external environmental state may include one or more obstacles, objects, and/or living persons. In an example embodiment, the external environmental state may include a map of solid objects and/or movement boundaries. Additionally or alternatively, the external environmental state may include one or more operating constraints. The one or more operating constraints may include a speed limit or range, a rate limit or range, etc. It is understood that a wide variety of operating constraints regarding robotic behavior are possible. All such operating constraints are contemplated within the scope of the present disclosure.

The processor 152 may be optionally configured to determine a goal to be accomplished by the robotic system 100. For example, the processor 152 may determine a goal via human input or a higher level goal determination process. Other ways of determining a goal are possible. In some embodiments, the goal may be determined before carrying out other blocks or steps described herein. Additionally or alternatively, the goal may be determined and/or adjusted "on the fly" while the robotic system 100 is carrying out the blocks or steps described herein. The processor 152 is operable to determine a plurality of possible task groups to be carried out by the robotic system 100 in pursuance of the goal. At least one task of each possible task group involves at least one actuator of the robotic system 100 (e.g. effector actuator 134).

As used herein, possible tasks and sub-goals that may be carried out "in pursuance of the goal" may include tasks/actions that could at least temporarily move the robotic system physically away from a particular goal location. For example, in order to move to a goal location, a robotic system may determine possible task groups that move the robot further away from the goal location so as to avoid obstacles, objects, or living beings. Other reasons for moving, at least temporarily, further away from the goal location are possible.

The processor 152 may be operable to determine, for each possible task group of the plurality of possible task groups, a respective task group score based on an expected performance capability when carrying out the respective possible task involving the at least one actuator. The at least one actuator may include at least one of: a linear actuator or a rotational actuator. In some embodiments, the least one actuator may be incorporated into a robotic appendage such as a robotic arm or a robotic leg.

The processor 152 may be configured to compare the task group scores for each possible task group. The processor 152 may, based on the comparison, select a task group from the plurality of possible task groups. For example, the selected task group may have the highest or lowest task group score from the plurality of task group scores. Additionally or alternatively, the selected task group may have a relatively higher or lower task group score compared to other task groups. Additionally, the processor 152 may be operable to cause the robotic system to carry out the selected task group.

Figure 2:
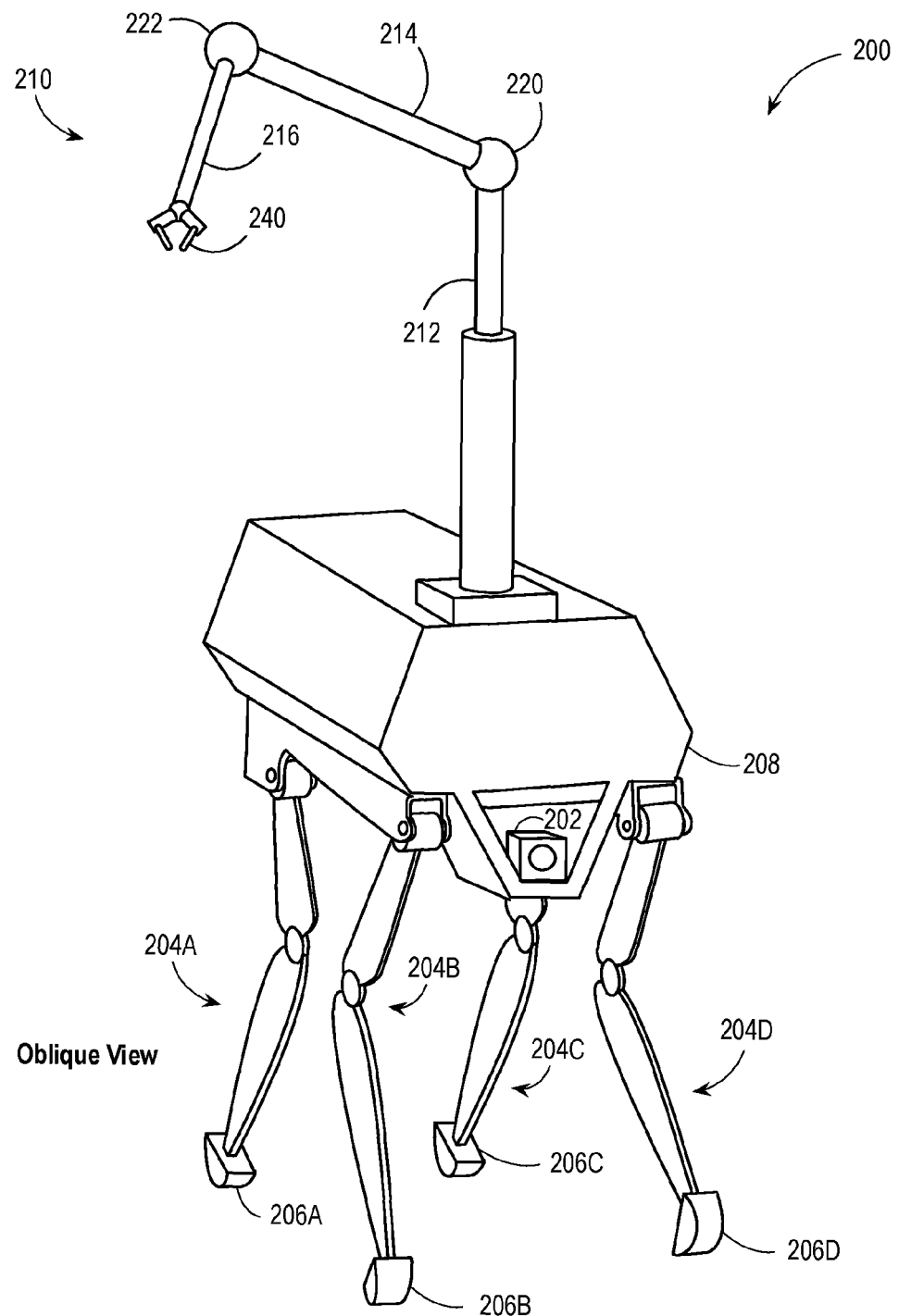
FIG. 2 illustrates a robotic system, according to an example embodiment.

FIG. 2 illustrates an oblique view of a robotic system 200, according to an example embodiment. Robotic system 200 may be arranged as a quadruped robot. In other words, robotic system 200 may have four legs 204A-D, each leg having a respective foot 206A-D. The legs 204A-D may provide a mobile base for a body 208 of the robotic system 200.

The robotic system 200 may include any of the subsystems or elements described herein. For instance, robotic system 200 may include similar or identical elements as illustrated and described in reference to FIG. 1. In an example embodiment, the robotic system 200 may include a camera 202.

The robotic system 200 may include at least one robotic arm 210. The robotic arm 210 may include a plurality of arm segments 212, 214, and 216. The arm segments may be coupled via articulable joints 220 and 222. Furthermore, the robotic arm 210 may be arranged with a gripper 240. The robotic arm 210 may have a reach radius based at least on a range of motion of the joints and a length of each respective arm segment. The robotic system 200 may have a center of gravity based at least on a pose of the legs 204A-D and the robotic arm 210.

Figure 3:
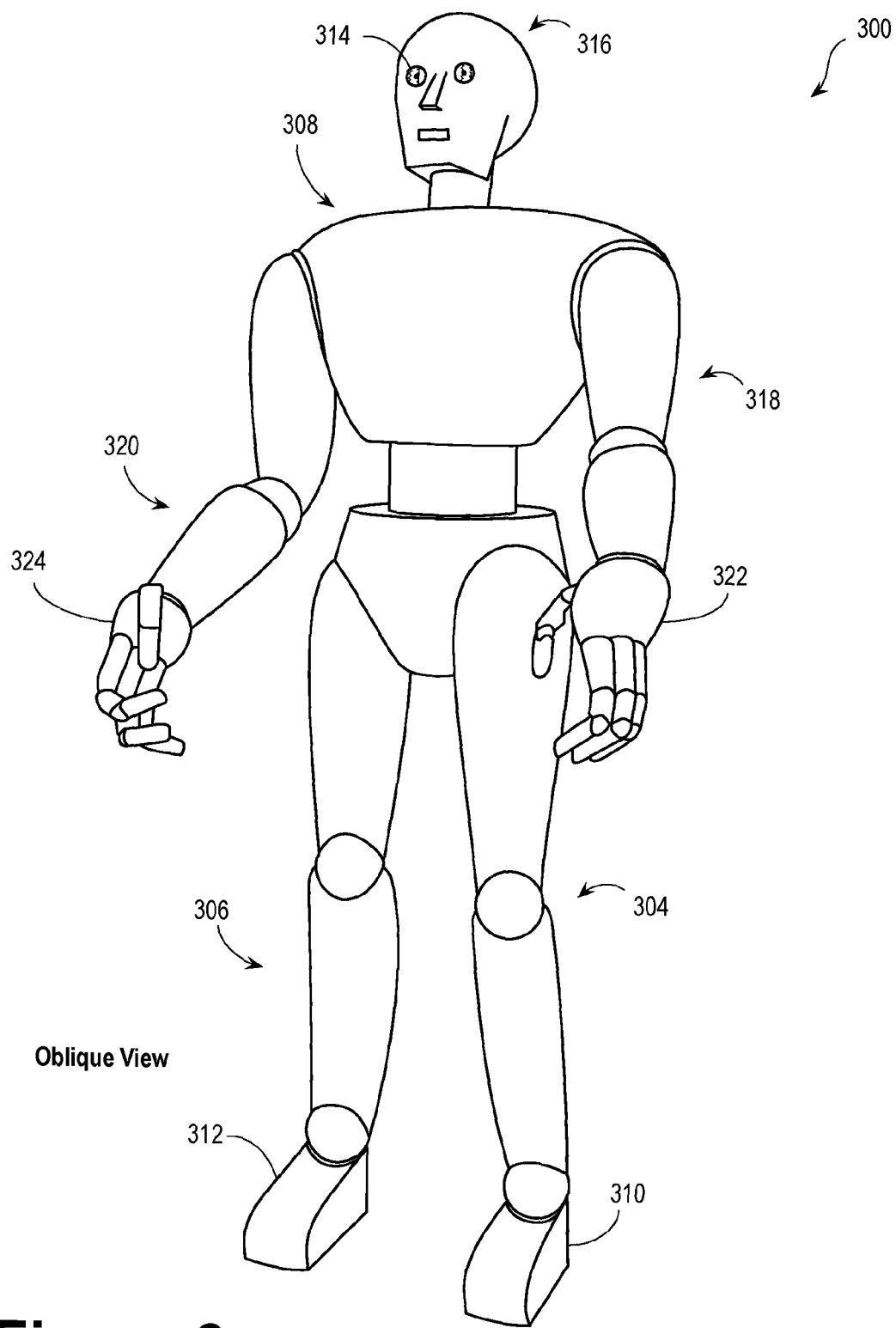
FIG. 3 illustrates a robotic system, according to an example embodiment.

FIG. 3 illustrates an oblique view of a robotic system 300, according to an example embodiment. The robotic system 300 may be arranged as a biped robot. That is, the robotic system 300 may include two legs 304 and 306, each leg having a respective foot 310 and 312. The legs 304 and 306 may provide a mobile base for a torso 308.

The robotic system 300 may also include two arms 318 and 320 coupled to the torso 308, each arm having a respective hand 322 and 324. The hands 322 and 324 may be operable to grasp and/or lift objects. The robotic system 300 may include a head 316 coupled to the torso 308.

The robotic system 300 may include any of the subsystems or elements described herein. For instance, robotic system 300 may include similar or identical elements as illustrated and described in reference to FIG. 1. In an example embodiment, the robotic system 300 may include sensors such as camera 314.

The robotic system 300 may have a reach radius based at least on a range of motion of the joints and a length of each respective arm segment of arms 320 and 318. The robotic system 300 may have a center of gravity based at least on a pose of the legs 304 and 306, the torso 308, and the arms 318 and 320.

Figure 4:
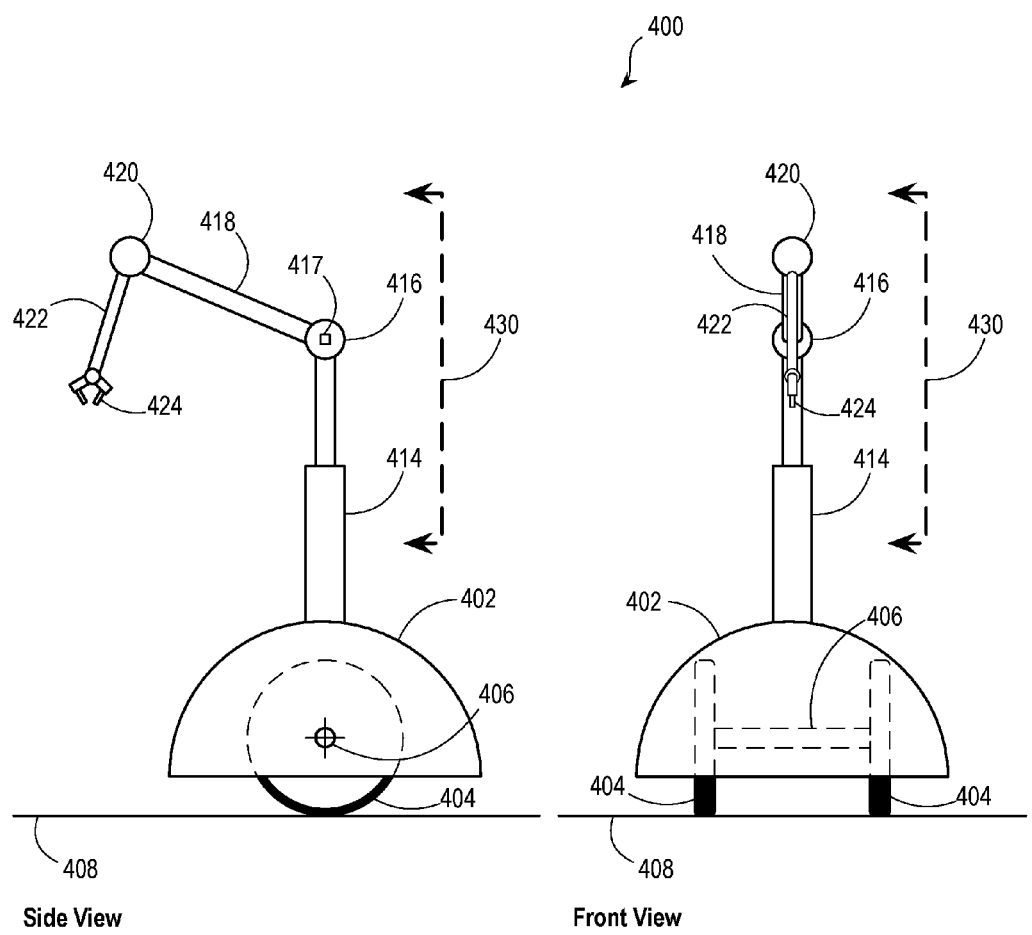
FIG. 4 illustrates a robotic system, according to an example embodiment.

FIG. 4 illustrates side and front views of a robotic system 400, according to an example embodiment. The robotic system 400 includes a mobile base 402. The mobile base 402 includes wheels 404, which may be coupled via an axle 406. The wheels 404 may be configured to roll along a ground surface 408.

The robotic system 400 may include at least one robotic arm 430. The robotic arm 430 may include a plurality of arm segments 414, 418, and 422. The arm segments may be coupled via joints 416 and 420. In an example embodiment, the joints 416 and 420 may include at least one sensor configured to provide information indicative of a pose of the robotic arm 430 such as angle encoder 417. The robotic arm 430 may include an end effector 424, such as a gripper.

The robotic system 400 may have a reach radius based at least on a range of motion of the joints 416 and 420 and a length of each respective arm segment of arms 414, 418, and 422. The robotic system 400 may have a center of gravity based at least on a pose of the robotic arm 430.

III. Example Control Scheme

Figure 5:
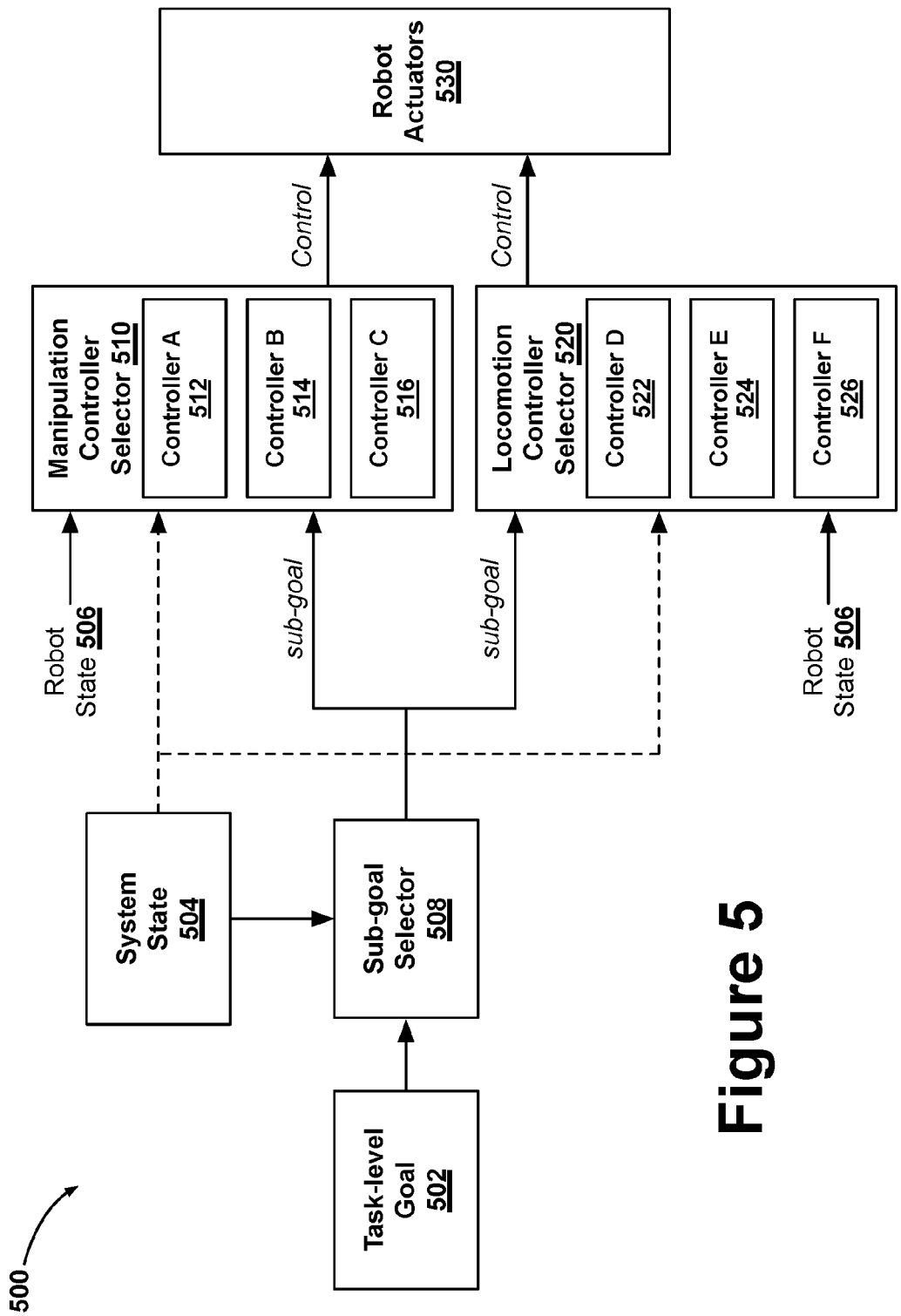
FIG. 5 is a schematic block diagram of a control scheme, according to an example embodiment.

FIG. 5 is a schematic block diagram of a control scheme 500, according to an example embodiment. The control scheme 500 includes a task-level goal 502, a system state 504, a sub-goal selector 508, a manipulation controller selector 510, a locomotion controller selector 520, and robot actuators 530. The control scheme 500 may be implemented on computing devices or control devices coupled to a robotic device. In some instances, components of the control scheme 500 may be included on a robotic device, while other components are implemented on separate computing devices in communication with the robotic device.

The task-level goal 502 and the system state 504 serve as inputs to the sub-goal selector 508, which outputs a sub-goal to the manipulation controller selector 510 and the locomotion controller selector 520. The manipulation controller selector 510 receives the sub-goal, the robot state 506, and the system state 504 in some implementations. Based on these inputs, the manipulation controller selector 510 selects a controller from among controllers A, B, and C, and outputs control instructions to the robot actuators 530 (or a subset of those actuators associated with the robot's manipulator). Similarly, the locomotion controller selector 520 receives the sub-goal, the robot state 506, and the system state 504 in some implementations. Based on these inputs, the locomotion controller selector 520 selects a controller from among controllers A, B, and C, and outputs control instructions to the robot actuators 530 (or a subset of those actuators associated with the robot's locomotion). In response to receiving control instructions or signals from the controller selectors, the actuators carry out the specified control.

The task-level goal 502 may be any goal that a robotic device can measurably accomplish. For example, a task-level goal of "move through the door" may be accomplished when the robotic device has passed through a frame of the door. Accordingly, carrying out a task-level goal may involve moving the robotic device, exerting a force by the robotic device, the result of an interaction of the robotic device with an element within an environment, or some combination thereof.

A robotic device may have to perform one or more operations to accomplish the task-level goal 502. For the task-level goal of "move through the door," the robotic device may need to move to the door, open the door if it's closed, and pass through the open door in order to accomplish the goal. Each of these constituent requirements of a task-level goal 502 may be referred to herein as "sub-goals." The task-level goal 502 may be associated with one or more sub-goals, which are provided to the sub-goal selector 508.

Depending upon the state of the system, certain sub-goals may or may not need to be accomplished before the task-level goal is accomplished. For example, if the door is open, then the sub-goal of "open the door" is already accomplished without a control effort by the robotic device. However, if the door is closed, the sub-goal of "open the door" may involve the robotic device using its manipulator to grip the door handle and open the door.

The system state 504 may be any combination of information and parameters relating to the robotic device, the environment of the robotic device, and/or the relationship between the robotic device and its environment. The information and parameters included within system state 504 may be provided to the sub-goal selector 508 as inputs.

As described herein, a "state parameter" may refer to a condition, variable, characteristic, feature, or other measure factor of a robotic device, the environment in which it is present, or the relationship between as aspect of the robotic device and an aspect of the environment. A "state parameter" may include robot parameters and environmental parameters, among other possible parameter types. Parameters may be independent measurements or relative measurements. Some parameters may be single measurable aspects of the system (e.g., the distance between a robotic manipulator and a door knob). Other parameters, such as conditions, may be inferences drawn from one or more measured aspects of the system (e.g., if a robot's foot position changes quickly while the robot's body position does not move, an inference can be drawn that the robot is slipping). Some parameters may simply represent whether some system condition is true or false (e.g., either a door is open or closed).

State parameters may be determined based on sensor measurements, imaging data, feedback from robotic operations, a model of the environment, a model of the robot, human specified inputs, and/or data previously captured by other devices or robots. For example, a robotic device may capture an image of the door, which may then be processed by a computing device to determine whether than door is open or closed. As another example, the robotic device may determine the distance to the door knob with respect to the robot's body position (e.g., using stereoscopic imaging) and the distance to the end of the robotic manipulator with respect to the robot's body position (e.g., by applying reverse kinematics to a model of the robot based on the robot's actuator positions), and apply a formula (e.g., the distance formula) to determine the distance between a robotic manipulator and a door knob. Any combination of measurement techniques, computations, and steps may be involved in determining a "parameter," without departing from the scope of the present disclosure.

As described herein, the "state" of the system may refer to a combination of state parameters at a given point in time. Portions of the control scheme (e.g., the sub-goal selector, the manipulation controller selector, the locomotion controller selector, etc.) may receive the system state, or a subset of the system state that includes some of the state parameters. In some implementations, a particular portion of the control scheme may be configured to receive the relevant parameters (e.g., the sub-goal selector may receive the parameter or parameters used in selecting a particular sub-goal). Regardless of whether the entire system state or a subset of the system state is provided to a given portion of the control scheme, the description herein may simply refer to a component "receiving the system state." It should be understood that this may refer to receiving state parameters relevant to that component of the control scheme in making a particular decision (e.g., selecting a sub-goal, selecting a controller, etc.).

Note that the system state 504 may or may not be provided as an input into the manipulation controller selector 510 and the locomotion controller selector 520. In some scenarios, the selection of manipulation and locomotion controllers depends primarily on the state of the robot. For instance, if a robot is slipping, the locomotion controller "recovery" should be used to compensate for the instability; in this example, no environmental considerations are taken into account in selecting the "recovery" controller. However, as another example, if the robot is having difficulty opening a door (e.g., if the door is heavy or presents a large resistance), the locomotion controller may use a "stronger" stance that allows the robot to exert a greater force on the door. In this example, the degree of resistance provided by the door may, in some circumstances, be considered an environmental parameter (since the door is a part of the environment, and not the robot). However, a high resistance door may be inferred from robotic feedback (e.g., the robot pushes on the door, but is unable to move forward using a "weak" stance); here, the locomotion controller might select a "stronger" stance based on the robot exerting a force and not moving. Because this distinction between environmental parameters and robot parameters may depend on perspective and specific implementation details, the manipulation controller selector 510 and the locomotion controller selector 520 may receive the system state 504 in addition to the robot state 506.

The sub-goal selector 508 may select a particular sub-goal of the task-level goal 502 based on the system state 504. The sub-goal selector 508 may use a relationship between one or more system parameters and the sub-goals of task-level goal 502 to determine which sub-goal to provide to the manipulation controller selector 510 and the locomotion controller selector 520.

In some embodiments, the "relationship" between one or more system parameters and the sub-goals of task-level goal 502 may be a mapping of the variable space of those system parameters to the sub-goals. As one example, a system parameter of "door open?" may have a variable space of "true" and "false." The sub-goal of "open the door" may be mapped to "door open?" being "false." As another example, a system parameter of "distance to door" may have a variable space ranging from negative infinity to zero. The sub-goal of "walk to the door" may be mapped to the "distance to door" parameter values from negative infinity to one meter, such that the sub-goal of walking to the door is executed until the robot is within one meter of the door.

A sub-goal may be mapped to one or more parameter variable "spaces" (e.g., a range of values of the parameter); put differently, determining which sub-goal to carry out may depend on one or more factors. In some instances, a sub-goal may ignore one or more parameters based on the values of other parameters (e.g., the state of the door may not affect the robot's operation until the robot is close to the door). Regardless of the implementation, the sub-goal selector 508 may receive state parameters 504 and, based on a defined relationship between the parameter values and sub-goals, select a sub-goal that serves as a basis for selecting manipulation and locomotion controllers.

The manipulation controller selector 510 may receive the selected sub-goal, the robot state 506, and (in some cases) the system state 504, and select a "controller" from among controllers A, B, and C for the robotic device's manipulator. For manipulation, a given controller may specify a certain manipulator technique, operation, amount of force to apply, speed, or any other operative aspect of the manipulator. Some example manipulation controllers include "arm in rest posture," "arm pushes door," "arm moves towards door," and "arm moves to rest posture," among other possible manipulation controllers.

The manipulation controller selector 510 may include program logic, stored relationships, variable space mappings, and/or other information to facilitate the selection of a controller based on the sub-goal and the inputted state parameters. Such relationships between state parameters and controllers may be similar to the above-described relationship between state parameters and sub-goals.

In some embodiments, each sub-goal of the task-level goal 502 may have a corresponding manipulation controller selector 510. Such control schemes may have different manipulation controller selectors because accomplishing each sub-goal may involve different steps or operations. For example, a sub-goal of "walk to the door" may be associated with a manipulation controller selector having a controller of "arm at rest," because walking the door may not involve using the manipulator. As another example, a sub-goal of "open door" might be associated with a manipulation controller selector having controllers "push door," "pull door," and "turn doorknob," such that the manipulation controller selector chooses the appropriate controller for the particular door that it encounters. Thus, the control scheme 500 may include additional manipulation controller selectors.

In some embodiments, the manipulation controller selector 510 may include one or more controller "sets" each corresponding to a particular sub-goal. In these embodiments, selecting a controller may involve selecting one of these sets based on the input sub-goal, then selecting a controller from that set based on the state of the robot and/or the state of the system.

Once a controller is selected, the manipulation controller selector 510 may cause the robot's manipulator to begin operating based on that controller. In some implementations, this may involve instructing a separate control system to use the selected controller when controlling the robot's manipulator. In other embodiments, the manipulation controller selector 510 may be interfaced with the joint actuators of the robot's manipulator, such that the manipulation controller sends instructions or signals directly to those actuators to control the robot's manipulator. Regardless of the particular implementation, the manipulation controller selector 510 may cause some of the robot's actuators to operate in accordance with the selected controller.

The locomotion controller selector 520 may, similarly to the manipulation controller selector 510, receive the selected sub-goal, the robot state 506, and (in some cases) the system state 504, and select a "controller" from among controllers D, E, and F for the robotic device's locomotion. For locomotion, a given controller may specify a certain gait (e.g., walk, trot, run, skip, bound, gallop, etc.), limb operation (e.g., recover, jump, crouch, etc.), or stance (e.g., weak, strong, etc.). Other locomotion controllers may specify the behavior of other locomotive elements of a robotic device, such as fins, flippers, wheels, and/or other elements that facilitate movement. It should be understood that the present disclosure is not limited to a particular type of locomotion.

The locomotion controller selector 510 may also include program logic, stored relationships, variable space mappings, and/or other information to facilitate the selection of a controller based on the sub-goal and the inputted state parameters. Such relationships between state parameters and controllers may be similar to the above-described relationship between state parameters and sub-goals.

In some embodiments, each sub-goal of the task-level goal 502 may have a corresponding locomotion controller selector 520. Such control schemes may have different locomotion controller selectors because accomplishing each sub-goal may involve different steps or operations. For example, a sub-goal of "walk to the door" may be associated with a locomotion controller selector having the controllers of "walk," "recovery," and "stand," such that the locomotion controller selector 520 chooses the appropriate controller based on the state of the robot's balance and distance to the door. The locomotion controller selector 520 may also include other walking gaits, which may vary by stepping pattern and speed, as well as transitional gaits (e.g., a controller for switching from walking to running).

In some embodiments, the locomotion controller selector 520 may include one or more controller "sets" each corresponding to a particular sub-goal. In these embodiments, selecting a controller may involve selecting one of these sets based on the input sub-goal, then selecting a controller from that set based on the state of the robot and/or the state of the system.

Once a controller is selected, the locomotion controller selector 520 may cause the robot's legs or other locomotive components to begin operating based on that controller. In some implementations, this may involve instructing a separate control system to use the selected controller when controlling the robot's manipulator. In other embodiments, the locomotion controller selector 520 may be interfaced with the joint actuators of the robot's legs or other locomotive components, such that the locomotion controller sends instructions or signals directly to those actuators to control the robot's locomotion. Regardless of the particular implementation, the locomotion controller selector 520 may cause some of the robot's actuators to operate in accordance with the selected controller.

Figure 6A:
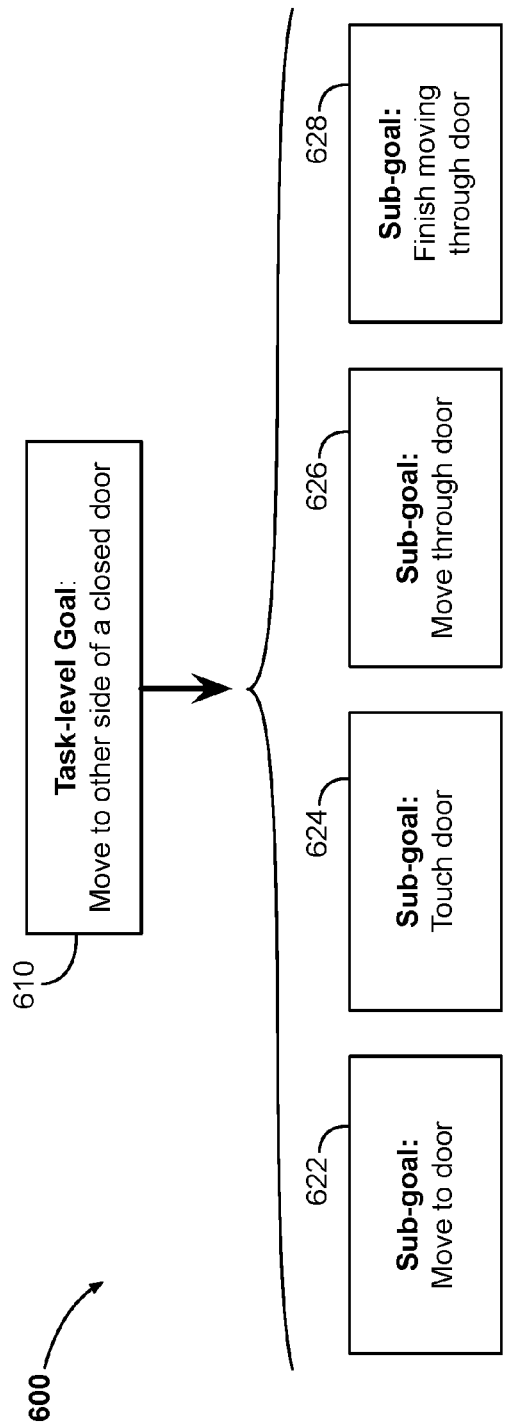
FIG. 6A illustrates a sub-goal selection operation, according to an example embodiment.
Figure 6B:
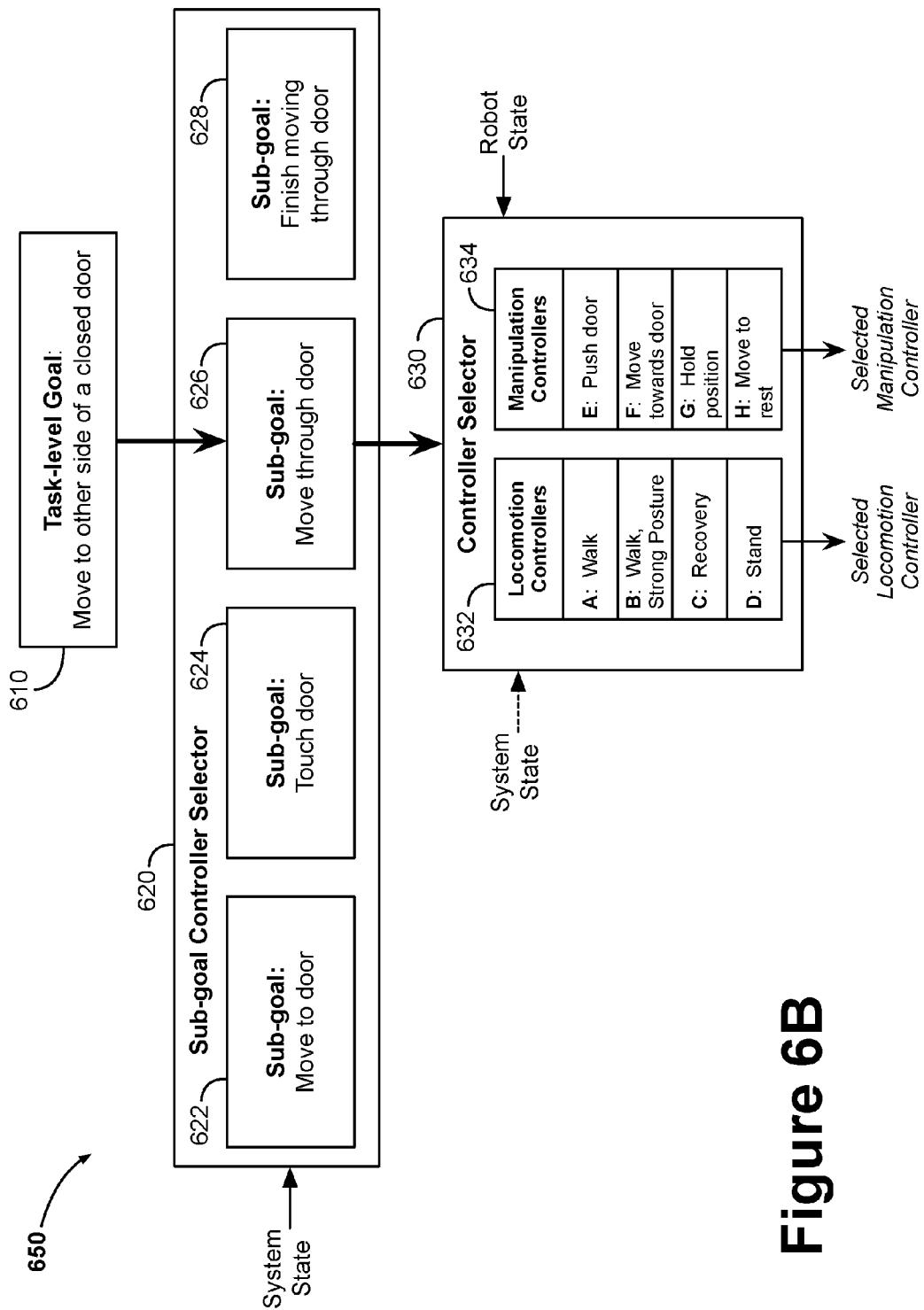
FIG. 6B illustrates a controller selection operation, according to an example embodiment.

FIG. 5 represents an example control scheme 500 that may be applied in a variety of circumstances. FIGS. 6A and 6B illustrate an example application of the control scheme 500 to a particular scenario. Note that the above description with respect to FIG. 5 described an example scenario in which a legged robot carries out the task-level goal of moving through a door. FIGS. 6A and 6B and the following description relate to an example of a quadruped robot with a manipulator (e.g., like robotic device 200 in FIG. 2) moving through a closed door. In the following example, the door is a "push" door with respect to the direction through which the robot moves through the door.

FIG. 6A illustrates a sub-goal selection operation 600, according to an example embodiment. The task-level goal 610 of "move to other side of a closed door" includes four sub-goals: sub-goal 622 of "move to door," sub-goal 624 of "touch door," sub-goal 626 of "move through door," and sub-goal 628 of "finish moving through door." The sub-goals 622, 624, 626, and 628 may represent a set of requirements that should be fulfilled before the task-level goal 610 is accomplished.

Note that, in some embodiments, the sub-goals are prioritized or otherwise completed in order. For instance, sub-goal 624 of "touch door" cannot be accomplished until the robot has moved to the door (that is, once sub-goal 622 is complete). Thus, certain task-level goals may include sequentially completed sub-goals, while other task-level goals may be accomplished through an unordered set of sub-goals.

FIG. 6B illustrates a controller selection operation 650, according to an example embodiment. In FIG. 6B, the sub-goals 622, 624, 626, and 628 are parts of the sub-goal controller selector 620, which receives the system state and selects a particular sub-goal to pass on to controller selector 630. In this example, the system state may include parameters such as "distance to door" being less than or equal to 2 feet, "door open?" being equal to "false," and "door being touched by manipulator" being equal to "true." Thus, the sub-goal controller selector 620 determines that the robot is ready to move through the door by pushing it open and walking through it, and selects sub-goal 626 of "move through door."

Sub-goal 626 of "move through door" may involve pushing the door open, then moving through the pushed open door to the other side of the door. In order to accomplish sub-goal 626, the controller selector 630 selects a locomotion controller from among a set of locomotion controllers 632 and a manipulation controller from among a set of manipulation controllers 634 based on the received robot state and system state.

Parameters relevant to the selection of a locomotion controller in this example may include whether or not the robot has passed through the door, the amount of force required to push open the door, and whether or not the robot is slipping. If the door provides a small amount of resistance, such that the robot can walk through the door using a normal walking gait, the controller selector 630 may select controller A ("walk"). If the door provides a large amount of resistance, such that robot does not push with enough force to open the door using a normal walking gait, the controller selector 630 may select controller B ("walk, strong posture," which might plant the robot's legs to allow the robot to push the door open with greater force compared to controller A). If the door provides a large resistance, or if the surface on which the robot is walking is slick or wet, the robot may slip; in this scenario, the controller selector 630 may select controller C ("recovery"). If the robot has passed through the door, the controller selector 630 may select controller D ("stand").

Parameters relevant to the selection of a manipulation controller in this example may include the amount by which the manipulator is extended from the robot's body, whether or not the robot can push the door open using only its manipulator, and whether or not the robot has passed through the door. If the door presents little resistant, such that a small force can push open the door, controller E may be selected ("push door"). If the robot needs to use greater force to push open the door using a stronger stance, controller G may be selected ("hold position," such that the robot's manipulator remains rigid as the robot pushes through the door). If the robot is slipping, moving the manipulator may adversely impact recovery efforts, so controller G may be selected to prevent the robot's manipulator from moving. If the door is pushed away from the robot's manipulator, such that the manipulator is no longer touching the door, controller F may be selected ("move towards door"). If the robot has moved through the door, controller H may be selected ("move to rest").

Other conditions, parameters, and other aspects of the system and the robot may be considered in selecting the locomotion and manipulation controllers. Additionally, the above-described examples are provided for explanatory purposes; other mappings between parameters and controllers may be employed, depending upon the particular robot, task-level goal, sub-goal, or overall scenario.

IV. Example Relationships Among System State Parameters, Sub-Goals, and Controllers FIG. 7 is a table 700 illustrating an example relationship between system state parameters and sub-goals, according to an example embodiment. In the table 700, the left column represents a variable space for the parameter "distance from door," the middle column represents a variable space for the parameter "door open?", and the right column represents a particular sub-goal. Each row represents a single relationship, which maps variable spaces for the system state parameters to a particular sub-goal. When selecting a sub-goal, a sub-goal selector (such as sub-goal selector 508) may use a relationship table like table 700 in order to select a sub-goal.

In this example, the sub-goal "move to door" is selected when "distance from door" is greater than two feet. Note that the sub-goal "move to door" does not consider whether or not the door is open.

The sub-goal "open door" is selected when "distance from door" is less than or equal to two feet (and, in some implementations, less than zero feet, since the variable space for "distance from door" extends from infinity to zero), and when the door is not open. In this example, the door may be opened by the robot prior to moving through the door.

The sub-goal "move through door" is selected when "distance from door" is less than or equal to two feet (and, in some implementations, less than zero feet, since the variable space for "distance from door" extends from infinity to zero), and when the door is open.

The sub-goal "finished moving through the door"—indicating that the task-level goal has been accomplished—is accomplished when "distance from door" is equal to "through door" (which might be indicated by a value of zero, a negative value, or some other indication).

FIG. 8A is a table 800 illustrating an example relationship between system state parameters, locomotion controllers, and manipulation controllers, according to an example embodiment. In FIGS. 8A and 8B, the columns of "robot state," "environment state," and "environment parameters" may collectively refer to the system state parameters. Each row represents a relationship, which maps variable spaces for the system state parameters to a locomotion controller and a manipulation controller. Note that a particular locomotion controller or manipulation controller may appear in multiple relationships.

The sub-goal of "move to door" may be associated with table 800. In this example, if the robot is stable and no obstructions are present in front of the robot, the robot may be instructed to trot with its manipulator at rest. If the robot is slipping, the robot may be instructed to recover with its manipulator at rest. If the robot's manipulator moves (e.g., due to external influences), the robot may be instructed to trot and move its manipulator back to a rest position. If an obstruction is present in front of the robot, the robot may be instructed to stand with its manipulator at rest, to avoid colliding with the object and act in a safe manner.

FIG. 8B is a table 800 illustrating an example relationship between system state parameters, locomotion controllers, and manipulation controllers, according to an example embodiment. The sub-goal of "move through door" may be associated with table 810.

In this example, if the robot is stable and the door is closed, the robot is instructed to walk forward while the manipulator moves toward the door. If the robot is stable, the door is closed, and the door is determined to present a low amount of friction, the robot is instructed to walk forward while the manipulator pushes the door. If the robot is stable, the door is closed, and the door is determined to present a high amount of friction, the robot is instructed to walk forward with a strong posture (to provide better footing and greater force against the door) while the manipulator pushes the door. If the robot is stable and the door is open, the robot is instructed to walk forward with its manipulator at rest. If the robot is slipping, the robot is instructed to recover.

As shown in tables 800 and 810, the particular locomotion and manipulation operations to perform in order to accomplish a particular sub-goal may depend on the state of the robot and the environment. To improve the robustness of the system, a mapping of state parameters to controls allows the robot to respond to changes in the environment and/or adapt to different environmental conditions. For example, using table 810, the same sub-goal of "move through door" may be applied to different doors that present different amounts of resistance. In this manner, a task-level goal of "move to the other side of a closed door" can be applied in different scenarios, rather than having to choreograph different task-level goals for each scenario.

V. Example Methods

Figure 9:
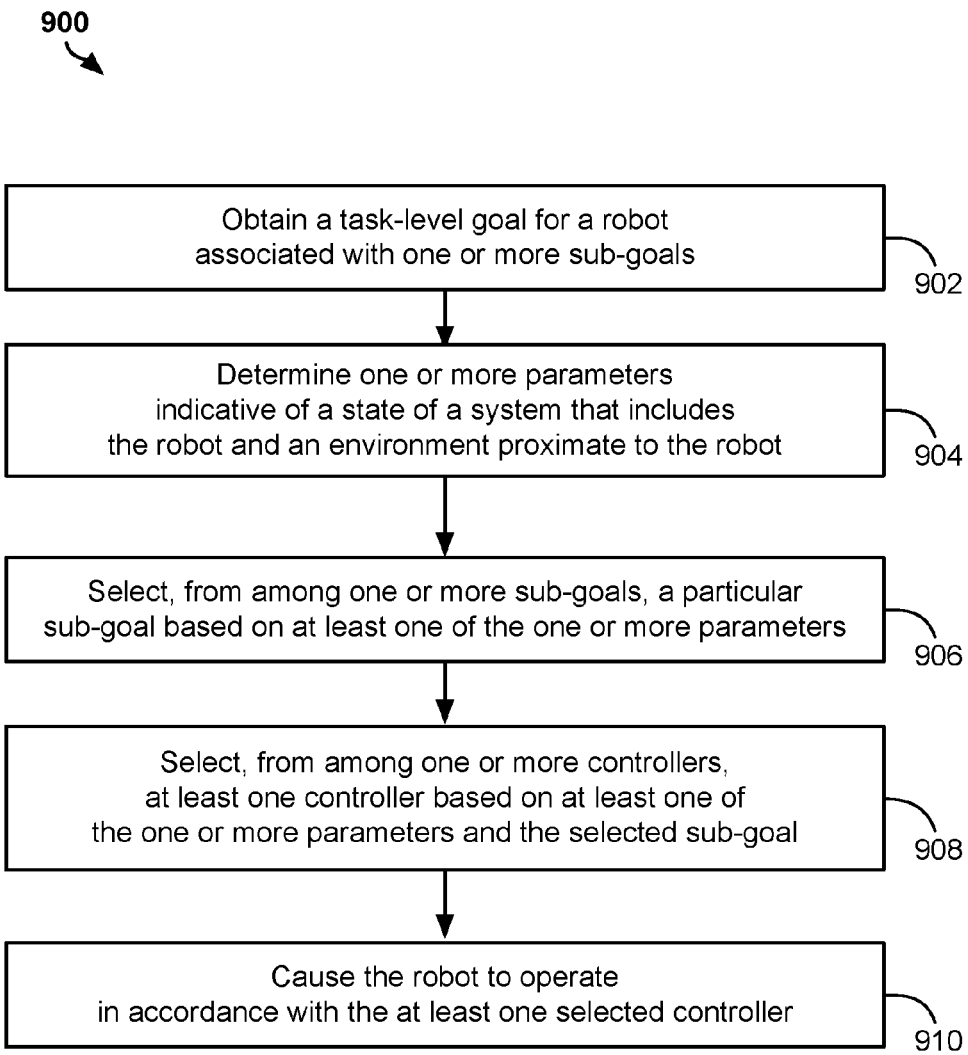
FIG. 9 is a flow chart illustrating a method, according to an example embodiment.

FIG. 9 is a flow chart illustrating operations 900 of a method for carrying out robotic tasks, according to an example embodiment. Operations 900 shown in FIG. 9 present an implementation that could be used by computing devices or control systems. Operations 900 may include one or more actions as illustrated by blocks 902-910. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 900 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one of more blocks in FIG. 9 may represent circuitry that is wired to perform the specific logical operations.

A. Obtain a Task-Level Goal

At block 902, the method involves obtaining a task-level goal for a robot associated with one or more sub-goals. As described above, the task-level goal may be any high level robotic operation to be carried out by a robot. Obtaining the task-level goal may involve retrieving data and/or instructions representative of the task-level goal from memory or a data storage device. In other implementations, the task-level goal may be transmitted or otherwise provided to the robot as instructions from a separate controller or computing device. The task-level goal may be transmitted over a wired connection to the robot, or provided wirelessly over a local area network or a wide area network (e.g., the Internet).

In some instances, the task-level goal may not be robot-specific, and could be applied to multiple robots (e.g., "move to location" could be performed by a biped robot, a quadruped robot, a wheeled robot, etc.). The task-level goal may be associated with one or more sub-goals, where each of those sub-goals may represent an independent condition to satisfy in order to complete the task-level goal. For example, to accomplish "move to the other side of the closed door," the conditions to be met to satisfy such a task-level goal may include moving to the door, opening the door, and moving to the other side of the opened door. Thus, the sub-goals may be represented as conditions, where each condition may be satisfied by meeting parameter thresholds or requirements (e.g., to satisfy "move to door," the parameter "distance to door" must be within a threshold distance of the door).

The sub-goals may be associated with the task-level goal for a specific robot, for a class or group of robots, or for a particular scenario or environment, among other possible associations. Obtaining the sub-goals may involve retrieving instructions and/or data from a database which correlates task-level goals with sub-goals for specific robots and/or robot classes. For example, a sub-goal of "push open door" may involve using a manipulator attached to a quadruped robot ("push open door with manipulator"), or may involve using a robotic arm of a biped robot ("push open door with robotic arm"); thus, different robots may have different sub-goals for a particular task-level goal.

In other embodiments, the sub-goals associated with the task-level goal may the same for a group of robots, even if the robots in the group have different configurations and components. Instead of designating different sub-goals to account for differences between the robots, these embodiments may account for differences in the robots by using different controllers. For example, a sub-goal of "push open door" may involve using a particular manipulator controller for a quadruped robot with a manipulator, and a particular robotic arm controller for a biped robot with robotic arms; in this example, the sub-goal may be the same for different robots, and the controller selector chooses a controller that operates the robot-specific components.

B. Determine One or More Parameters

At block 904, the method involves determining one or more parameters indicative of a state of a system that includes the robot and an environment proximate to the robot. The system may also include other robots or objects within the environment as well. In some embodiments, a given parameter may relate to a condition of the robot, a condition of the environment or objects therein, or a relational condition between the robot and the environment (e.g., the distance of the robot with respect to an object within the environment). Robot-specific parameters collectively represent the state of the robot, while environment-specific parameters may collectively represent the state of the environment. Regardless of the manner in which parameters are designated, all parameters considered in selecting a sub-goal and/or in selecting a controller may collectively represent the state of the system.

A "parameter" may include both a label and a value. Put another way, a parameter may represent some characteristic of the system, and its value may describe that characteristic. For example, a parameter of "distance to object" may represent the distance between a robot and a particular object in the environment, and its value may be a number in a particular unit (e.g., a distance in meters). As described herein, "determining a parameter" may refer to determining the value of the parameter, and performing an action based on a parameter may refer to performing an action based on a value of the parameter. For the purposes of this application, a "parameter" may refer to its value.

Determining a parameter may involve receiving the parameter from a separate control system, measurement system, or other computing system. For example, a robot may include stereoscopic imaging devices capable of determining distances to objects, and determining a parameter indicating a distance to an object may involve requesting that information from a separate imaging system or device that processes the stereoscopic images to determine depth information.

Determining a parameter may also involve performing operations or calculations on one or more pieces of information. For example a parameter of "distance between two objects" may be determined by performing a calculation (e.g., the distance formula) on two separate distance measurements.

Determining a parameter may further involve performing more complex computations on information. For example, a parameter of "door open?" may involve processing one or more images in order to determine whether or not a door is open. Such image processing may, in some instances, involve providing images of the door to a machine learning tool in order to determine whether or not the door is open to some degree of confidence. Determining a Boolean parameter of "door open?" may involve comparing such a confidence rating against a threshold confidence (e.g., the door is open if the confidence rating is above 90%).

Further, determining a parameter may involve a human operator or technician manually designating a parameter value. Such a designation may be made during testing or product development, or during remote operation by a human operator who perceives the conditions via a camera feed or other sensor information available to the human operator.

In some scenarios, a parameter may not be calculated, measured, or otherwise determined because that parameter does not pertain to a particular task-level goal, a sub-goal, or selection of a particular controller. For example, if a legged robot is slipping, parameters other than those that relate to a robot's balance may not be determined until after the robot has restored its balance. Some implementations may limit parameter calculation in such scenarios in order to dedicate processing power to a high priority sub-goal or control requirement (in this example, restoring balance).

C. Select a Particular Sub-Goal

At block 906, the method involves selecting, from among one or more sub-goals, a particular sub-goal based on at least one of the one or more parameters. Selecting the sub-goal may involve applying the parameters to a table, function, or other relationship that outputs the sub-goal based on the values of the parameters. The tables described above may be implemented as a computer function, method, or relationship, such that plugging in the parameter values into the implemented computer function, method, or relationship outputs the selected sub-goal.

In some embodiments, selecting the sub-goal may involve providing the parameters to a computing device, which may be separate from the robot. For example, the robot may communicate the parameters to a remote computing device that executes the step of selecting the sub-goal. In other embodiments, the sub-goal selection step may be integrated within a control device, control system, computing device, or other processing device onboard the robot.

D. Select at Least One Controller

At block 908, the method involves selecting, from among one or more controllers, at least one controller based on at least one of the one or more parameters and the selected sub-goal. As described above, this step may involve selecting controllers for different subsystems of a robot. For the example of the quadruped robot with a manipulator, this step involves selecting controllers for at least one of the manipulator and the robotic legs.

In some cases, a robot may only have a single subsystem (e.g., a legged robot with no manipulator or other appendages, a robotic manipulator fixed to a particular location, etc.). In these cases, block 908 may involve selecting one controller from among one or more controllers for that subsystem.

In other cases, a robot may have any number of subsystems, and block 908 may involve selecting a controller for each of those subsystems. Any combination of controllable robotic components may form a subsystem without departing from the scope of the present application.

In some scenarios, block 908 may involve selecting controllers for only some of a robot's subsystems. This may occur if a particular sub-goal does not involve operating all of a robot's subsystems. For example, if a quadruped robot with a manipulator has a sub-goal of "move to a location," the subsystem for the manipulator may not be required in order to accomplish that sub-goal. In some implementations, block 908 may omit selecting a controller for subsystems that are not operated in pursuance of accomplishing a particular sub-goal (or task-level goal, in some cases).

E. Cause the Robot to Operate in Accordance with the at Least One Selected Controller At block 910, the method involves causing the robot to operate in accordance with the at least one selected controller. Block 910 may involve providing the selected controller to a control system, and instructing that control system to utilize the selected controller.

In some implementations, a controller may represent a control configuration for a control system (e.g., gain values of a feedback loop). In these implementations, block 910 may involve modifying the control system's configuration based on the control configuration specified by the selected controller.

Note that, as described herein, "causing the robot to operate in accordance with" a controller may refer to causing the robot to begin operating according to that controller. Put differently, a controller might specify operations or behaviors that may or may not be completed. It should be understood that "causing the robot to operate in accordance with" a controller refers to the initial change in the robot's behavior, and may continue for any duration before a different controller is used or the robot halts operation.

VI. Example Computer-Readable Medium

Figure 10:
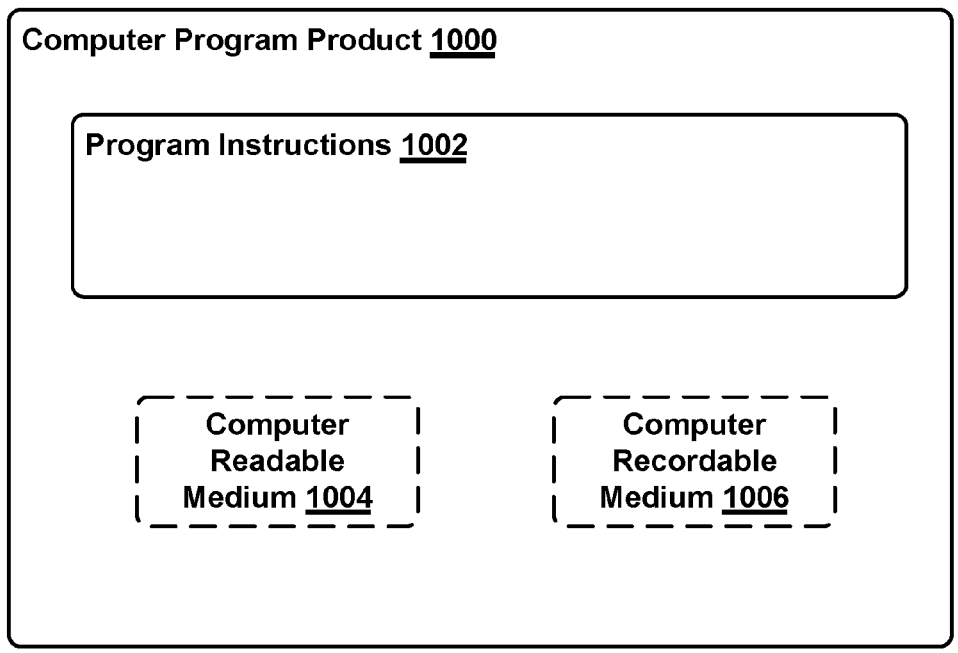
FIG. 10 is a block diagram of an example computer-readable medium, according to an example implementation.

FIG. 10 illustrates an example computer-readable medium configured according to at least some implementations described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 10 is a schematic illustrating a conceptual partial view of a computer program product that includes a computer program for executing a computer process on a computing device, arranged according to at least some implementations disclosed herein.

In some implementations, the example computer program product 1000 may include one or more program instructions 1002 that, when executed by one or more processors may provide functionality or portions of the functionality described above with respect to FIGS. 1-9. In some examples, the computer program product 1000 may include a computer-readable medium 1004, such as, but not limited to, a hard disk drive, a Compact Disc (CD), a Digital Video Disk (DVD), a digital tape, memory, etc. In some implementations, the computer program product 1000 may include a computer recordable medium 1006, such as, but not limited to, memory, read/write (R/W) CDs, R/W DVDs, etc.

The one or more program instructions 1002 can be, for example, computer executable and/or logic implemented instructions. In some examples, a computing device is configured to provide various operations, or actions in response to the program instructions 1002 conveyed to the computing device by the computer readable medium 1004 and/or the computer recordable medium 1006. In other examples, the computing device can be an external device in communication with a device coupled to the robotic device.

The computer readable medium 1004 can also be distributed among multiple data storage elements, which could be remotely located from each other. The computing device that executes some or all of the stored instructions could be an external computer, or a mobile computing platform, such as a smartphone, tablet device, personal computer, a robot, or a wearable device, among others. Alternatively, the computing device that executes some or all of the stored instructions could be a remotely located computer system, such as a server. For example, the computer program product 1000 can implement operations discussed in reference to FIGS. 1-9.

VII. Conclusion

It should be understood that arrangements described herein are for purposes of example only. As such, other arrangements and other elements (e.g. machines, interfaces, operations, orders, and groupings of operations, etc.) can be used instead, and some elements may be omitted altogether. Further, many of the elements that are described may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A robot comprising:
    at least one actuator;
    a control system configured to control the at least one actuator;
    memory hardware configured to contain instructions; and
    a processor configured to execute the instructions to perform operations, the operations comprising:
        obtaining a task-level goal for a robot associated with one or more sub-goals, wherein carrying out an operation in pursuance of a given sub-goal involves controlling at least one actuator of the robot, and wherein accomplishment of the one or more sub goals accomplishes the task-level goal;
        receiving at least one sensor signal indicative of an environment proximate to the robot;

determining, by the processor, one or more parameters indicative of a state of a system that includes the robot and the environment proximate to the robot;

selecting, from among the one or more sub-goals, a particular sub-goal based on at least one of the one or more parameters;

determining one or more controllers based on the selected sub-goal, wherein each sub-goal is associated with a corresponding set of one or more controllers;

selecting, from among the determined one or more controllers, at least one controller based on at least one of the one or more parameters and the selected sub-goal; and causing the control system to operate in accordance with the selected controller.

2. The robot of claim 1, further comprising a manipulator that is operable to interact with the environment, and wherein selecting the at least one controller comprises:

selecting, from among one or more manipulation controllers, a particular manipulation controller based on at least one of the one or more parameters and the selected sub-goal.

3. The robot of claim 2, wherein accomplishing the selected sub-goal involves the manipulator interacting with an object within the environment, and wherein causing the control system operate in accordance with the selected manipulation controller causes the manipulator to interact with the object.

4. A robot comprising:
at least one actuator;
a control system configured to control the at least one actuator;
a locomotive element configured to provide mobility to the robot;
memory hardware configured to contain instructions; and
a processor configured to execute the instructions to perform operations, the operations comprising:
obtaining a task-level goal for a robot associated with one or more sub-goals, wherein carrying out an operation in pursuance of a given sub-goal involves controlling at least one actuator of the robot, and wherein accomplishment of the one or more sub goals accomplishes the task-level goal;
receiving at least one sensor signal indicative of an environment proximate to the robot;
determining, by the processor, one or more parameters indicative of a state of a system that includes the robot and the environment proximate to the robot;
selecting, from among the one or more sub-goals, a particular sub-goal based on at least one of the one or more parameters;
selecting, from among one or more controllers, at least one controller based on at least one of the one or more parameters and the selected sub-goal; and
causing the control system to operate in accordance with the selected controller,
wherein selecting the at least one controller comprises selecting, from among one or more locomotion controllers, a particular locomotion controller based on at least one of the one or more parameters and the selected sub-goal.

5. The robot of claim 4, wherein accomplishing the selected sub-goal involves the robot moving to a particular location within the environment, and wherein causing the control system operate in accordance with the selected locomotion controller causes the locomotive element begin moving the robot toward the particular location.

6. The robot of claim 5, wherein the locomotive element includes one or more robotic legs, and wherein causing the control system operate in accordance with the selected locomotion controller causes the robot to begin stepping toward the particular location.

7. A method comprising:
obtaining, from a computing device, a task-level goal for a robot associated with one or more sub-goals, wherein carrying out an operation in pursuance of a given sub-goal involves controlling at least one actuator of the robot, and wherein accomplishment of the one or more sub goals accomplishes the task-level goal;
receiving, at a processor of the robot, at least one sensor signal indicative of an environment proximate to the robot;
determining, by the processor of the robot, one or more parameters indicative of a state of a system that includes the robot and the environment proximate to the robot;
selecting, from among the one or more sub-goals, a particular sub-goal based on at least one of the one or more parameters;
determining one or more controllers based on the selected sub-goal, wherein each sub-goal is associated with a corresponding set of one or more controllers;
selecting, from among the determined one or more controllers, at least one controller based on at least one of the one or more parameters and the selected sub-goal; and
causing the robot to operate in accordance with the at least one selected controller.

8. The method of claim 7, wherein selecting a particular sub goal comprises:
obtaining one or more relationships corresponding to the one or more sub-goals, wherein a given relationship associates a given sub-goal with variable spaces of the one or more parameters, and wherein a given variable space defines a set of values from among all possible values for a given parameter; and
selecting, from among the one or more sub-goals, the particular sub-goal based on the one or more parameters and the one or more relationships.

9. The method of claim 7, wherein the robot includes a manipulator that is operable to interact with the environment, and wherein selecting the at least one controller comprises:
selecting, from among one or more manipulation controllers, a particular manipulation controller based on at least one of the one or more parameters and the selected sub-goal.

10. The method of claim 9, wherein selecting the particular manipulation controller comprises:
obtaining one or more relationships corresponding to the one or more manipulation controllers, wherein a given relationship associates a given manipulation controller with variable spaces of the one or more parameters, and wherein a given variable space defines a set of values from among all possible values for a given parameter; and
selecting, from among the one or more manipulation controllers, a particular manipulation controller based on the one or more parameters and the one or more relationships.

11. The method of claim 9, wherein the manipulator includes a robotic arm and an end effector coupled to an end of the robotic arm.

12. The method of claim 7, wherein the robot includes a locomotive element that is operable to provide mobility to the robot, and wherein selecting the at least one controller comprises:
   selecting, from among one or more locomotion controllers, a particular locomotion controller based on at least one of the one or more parameters and the selected sub-goal.

13. The method of claim 12, wherein the at least one of the one or more parameters is indicative of a state of the robot.

14. The method of claim 12, wherein selecting the particular locomotion controller comprises:
   obtaining one or more relationships corresponding to the one or more locomotion controllers, wherein a given relationship associates a given locomotion controller with variable spaces of the one or more parameters, and wherein a given variable space defines a set of values from among all possible values for a given parameter; and
   selecting, from among the one or more locomotion controllers, a particular locomotion controller based on the one or more parameters and the one or more relationships.

15. The method of claim 14, wherein the particular locomotion controller is a first locomotion controller, and wherein the method further comprises:
   determining that a value of a particular parameter has changed; and
   responsive to the determination that the value of the particular parameter has changed, selecting, from among the one or more locomotion controller, a second locomotion controller based on the one or more parameters and the one or more relationships, wherein second locomotion controller is different from the first locomotion controller.

16. The method of claim 12, wherein the locomotive element is a robotic leg, and wherein selecting particular locomotion controller comprises:
   determining that the at least one of the one or more parameters indicates that the robotic leg is slipping; and
   responsive to the determination that the robotic leg is slipping, selecting a recovery locomotion controller that causes the robot to compensate for the slipping and restore balance.

17. The method of claim 7, further comprising:
   determining that the selected sub-goal has been accomplished; and
   based on the determination that the selected sub-goal has been accomplished, repeating the steps of (i) determining the one or more parameters, (ii) selecting a particular sub goal, (iii) selecting at least one controller, and (iv) causing the robot to operate in accordance with the at least one selected controller.

18. A non-transitory computer-readable medium having instructions stored thereon that, upon execution by at least one processor, causes performance of operations comprising:
   obtaining a task-level goal for a robot associated with one or more sub-goals, wherein carrying out an operation in pursuance of a given sub-goal involves controlling at least one actuator of the robot, and wherein accomplishment of the one or more sub goals accomplishes the task-level goal;
   receiving, at the at least one processor, at least one sensor signal indicative of an environment proximate to the robot;
   determining one or more parameters indicative of a state of a system that includes the robot and the environment proximate to the robot;
   selecting, from among the one or more sub-goals, a particular sub-goal based on at least one of the one or more parameters;
   determining one or more controllers based on the selected sub-goal, wherein each sub-goal is associated with a corresponding set of one or more controllers;
   selecting, from among the determined one or more controllers, at least one controller based on at least one of the one or more parameters and the selected sub-goal; and
   causing the robot to operate in accordance with the at least one selected controller.

* * * * *